United States Patent
Dietz

(10) Patent No.: US 11,781,024 B2
(45) Date of Patent: Oct. 10, 2023

(54) COMPOSITION COMPRISING INTERACTIVE INGREDIENTS

(71) Applicant: FP-Pigments Oy, Espoo (FI)

(72) Inventor: Paul Dietz, Espoo (FI)

(73) Assignee: FP-PIGMENTS OY, Espoo (FI)

( * ) Notice: Subject to any disclaimer, the term of this patent is extended or adjusted under 35 U.S.C. 154(b) by 0 days.

(21) Appl. No.: 14/905,323

(22) PCT Filed: Jul. 15, 2014

(86) PCT No.: PCT/FI2014/050577
§ 371 (c)(1),
(2) Date: Jan. 15, 2016

(87) PCT Pub. No.: WO2015/007954
PCT Pub. Date: Jan. 22, 2015

(65) Prior Publication Data
US 2016/0160002 A1    Jun. 9, 2016

(30) Foreign Application Priority Data

Jul. 16, 2013 (FI) ...................................... 20135772

(51) Int. Cl.
| | | |
|---|---|---|
| *C08K 9/02* | (2006.01) | |
| *C08K 3/26* | (2006.01) | |
| *C08K 3/22* | (2006.01) | |
| *C09D 7/62* | (2018.01) | |
| *C09C 1/40* | (2006.01) | |
| *C09C 1/50* | (2006.01) | |
| *C09C 1/02* | (2006.01) | |
| *D21H 17/67* | (2006.01) | |
| *C09C 1/30* | (2006.01) | |
| *C09C 3/06* | (2006.01) | |
| *D21H 17/69* | (2006.01) | |
| *D21H 17/00* | (2006.01) | |
| *C09C 1/36* | (2006.01) | |
| *D21H 19/66* | (2006.01) | |
| *D21H 19/38* | (2006.01) | |
| *C08L 33/06* | (2006.01) | |
| *C09D 133/06* | (2006.01) | |
| *C09D 133/08* | (2006.01) | |

(52) U.S. Cl.
CPC ................ *C09D 7/62* (2018.01); *C08K 3/22* (2013.01); *C08K 3/26* (2013.01); *C08L 33/06* (2013.01); *C09C 1/024* (2013.01); *C09C 1/027* (2013.01); *C09C 1/028* (2013.01); *C09C 1/3054* (2013.01); *C09C 1/3661* (2013.01); *C09C 1/405* (2013.01); *C09C 1/50* (2013.01); *C09C 3/063* (2013.01); *C09D 133/06* (2013.01); *C09D 133/08* (2013.01); *D21H 17/675* (2013.01); *D21H 17/69* (2013.01); *D21H 17/74* (2013.01); *D21H 19/385* (2013.01); *D21H 19/66* (2013.01); *C01P 2006/60* (2013.01); *C01P 2006/62* (2013.01); *C01P 2006/63* (2013.01); *C01P 2006/64* (2013.01); *C08K 9/02* (2013.01); *C08K 2003/2241* (2013.01); *C08K 2003/265* (2013.01)

(58) Field of Classification Search
None
See application file for complete search history.

(56) References Cited

U.S. PATENT DOCUMENTS

| | | | |
|---|---|---|---|
| 3,947,286 A | 3/1976 | Myers et al. | |
| 5,385,960 A | 1/1995 | Emmons et al. | |
| 7,081,488 B2 * | 7/2006 | Bardman ............... | B82Y 30/00 523/200 |
| 2006/0027141 A1 | 2/2006 | Tarng et al. | |
| 2007/0295247 A1* | 12/2007 | Remortel ............... | C09C 1/0084 106/481 |
| 2010/0218702 A1 | 9/2010 | Tarng et al. | |
| 2011/0011305 A1* | 1/2011 | Maijala ................. | B82Y 30/00 106/31.6 |
| 2011/0245369 A1 | 10/2011 | Lundgard et al. | |
| 2013/0000510 A1 | 1/2013 | Ribeiro et al. | |
| 2013/0085222 A1 | 4/2013 | Fasano et al. | |

FOREIGN PATENT DOCUMENTS

| | | |
|---|---|---|
| FR | 1474732 | 3/1967 |
| WO | 2009109705 A1 | 9/2009 |
| WO | 2012166830 A1 | 12/2012 |

OTHER PUBLICATIONS

International Search Report for PCT Serial No. PCT/FI2014/050577 dated Nov. 5, 2014.
Finnish Search Report for Application Serial No. 20135772 dated Apr. 17, 2014.

* cited by examiner

*Primary Examiner* — Richard A Huhn
(74) *Attorney, Agent, or Firm* — McCormick, Paulding & Huber PLLC

(57) ABSTRACT

A composition comprising titanium dioxide and additives useful for enhancing the optical performance of titanium dioxide or for allowing substitution of at least part of the titanium dioxide in said composition for additives. At least two additives are added, wherein a first additive comprises a composite pigment and a second additive comprises a reactive polymer. The invention also provides a method for enhancing the optical properties of titanium dioxide compositions.

14 Claims, No Drawings

COMPOSITION COMPRISING INTERACTIVE INGREDIENTS

CROSS REFERENCE TO RELATED APPLICATIONS

This application is entitled to the benefit of and incorporates by reference subject matter disclosed in International Patent Application No. PCT/FI2014/050577 filed on Jul. 15, 2014 and Finnish Patent Application No. 20135772 filed on Jul. 16, 2013.

FIELD OF THE INVENTION

This invention concerns a composition comprising titanium dioxide and additives useful for enhancing the optical performance of titanium dioxide or for allowing substitution for additives of at least part of the titanium dioxide in said composition. The invention concerns further a method for enhancing the optical properties of a composition comprising titanium dioxide and additives useful for enhancing the optical performance of titanium dioxide or for allowing substitution of at least part of the titanium dioxide in said composition.

BACKGROUND ART

Titanium dioxide is, due to its high refractive index, used as a light-scattering white pigment in paints, printing inks and many other coating compositions, and also in filling materials.

Titanium dioxide is expensive and difficult to recycle. In order to reduce the quantities required, titanium dioxide is typically mixed with additives, such as extenders. However, it is necessary to keep the amounts of extender very small, otherwise the optical properties which are achieved with titanium dioxide are lost, especially the opacity achieved, which is critically important in particular for paints and coating compositions, and for filling materials, too.

It is further important to note that in the market of white covering pigments there is no real substitute for titanium dioxide. However, the drawback with titanium dioxide is also its tendency to agglomerate, in which case its light-scattering power drops significantly.

Conventional waterborne $TiO_2$ containing coatings are under-utilizing $TiO_2$ by up to 40%. The main causes of this poor performance are pigment crowding and pigment flocculation. All currently used waterborne coatings underutilize $TiO_2$. However, the problem is worst in high to medium pvc (pvc=particle volume concentration) coatings where high levels of large extenders and relatively high levels of soluble salts can be present.

Conventional water-based coatings rely heavily on charge stabilization to disperse and maintain a stable $TiO_2$ dispersion.

Whilst it is possible to obtain a high degree of dispersion in the wet coating, similar to that in a solvent system, the $TiO_2$ dispersion quickly becomes unstable as the coating dries, initially through an increase in electrolyte concentration and ultimately through the loss of the charge stabilization in the dry film.

Titanium dioxide pigment is the primary opacifying pigment in most paints and coatings. The efficiency of the $TiO_2$ pigment is directly related to the dispersion, distribution and spacing of the pigment. In water-based coatings in particular the process of drying the film and the presence of particles larger than $TiO_2$ can lead to pigment flocculation and pigment crowding. In some systems, typically high pvc (pvc=particle volume concentration) water based paints, the $TiO_2$ can be up to 40% inefficient. The use of other raw materials to provide a physical barrier to the pigment flocculation (e.g. reactive polymers) and/or to reduce crowding (fine particle size extenders) is known to be able to improve the efficiency of the $TiO_2$ and allow up to 25 wt-% replacement without detriment to opacity or mechanical properties.

However, replacement levels higher than 25 wt-% usually lead to changes in some properties, which are unacceptable to the coatings producer and end user. Combinations of known $TiO_2$ efficiency improvers can be made to improve the cost balance of the $TiO_2$ replacement without sacrificing some coating properties, however it is unlikely that replacement levels above 25 wt-% can be routinely found.

Attempts to solve the problem have been made. For example, addition of one or more dispersants can be helpful to disperse the $TiO_2$ and can provide some steric stability during and after drying.

Spacing technology, such as fine particle size extenders (mean size≤1.0 μm), alternative opacifiers (e.g. DOW Ropaque OP Ultra E, Burgess Optiwhite MX), composite spacers (FP-Pigment's FP-460) and reactive polymers (Dow EVOQUE™ and other DOW Avanse™ Materials) have been used to solve the problem. Each of the additives used allows up to 25 wt-% of the $TiO_2$ in a coating to be removed and replaced by the additive with different effects on optical and mechanical film properties varying from no significant change to significant changes in one or more attribute.

Reactive polymers, suitable for partial substitution of titanium dioxide have been suggested in the art. U.S. Pat. No. 5,385,960 A describes polymeric latex particles capable of adsorbing onto titanium dioxide particles. U.S. Pat. No. 7,081,488 B2 describes reactive polymer comprising polymer particles capable of forming covalent bonds with pigments such as titanium dioxide. The covalent bonds are formed directly between the pigment and the reactive polymer. Alternatively, the covalent bond is created indirectly by a reacted coupling agent bound to the reactive polymer and being capable of binding covalently to the pigment. US 2013/0085222A1 concerns latex compositions for coatings with relatively high opaque polymer pigment volume concentration in combination with fully or partially polymer encapsulated $TiO_2$ particles and relatively low levels of extender.

Composite pigments have also been used to partially substitute titanium dioxide in coatings, paints and other compositions. Such a composite pigment is described in WO 2009/109705 A1 (FP-Pigments Oy). This composite pigment comprises pigment particles, e.g. particles of titanium dioxide, at least partly encased by a shell formed of precipitated calcium carbonate. These composite pigments were produced by atomizing a calcium hydroxide-bearing aqueous slurry comprising pigment particles into a carbon dioxide-bearing gas, wherein the calcium hydroxide was converted to calcium carbonate. These composite pigments are useful for substituting rather high contents of titanium oxide in compositions without adverse effect on the optical properties of the composition. The favorable properties of the composite pigments are mainly a result of the fact that the pigment particles, e.g. titanium dioxide particles, are separated from each other by the calcium carbonate structures in such a way that the distance between them is increased.

US 2011245369 discloses a coating composition comprising a polymer and a pigment, e.g. titanium dioxide, partially encapsulated by the polymer. The composition may comprise also a second pigment, such as titanium dioxide. The composition may also comprise a binder composition such as acrylic latex, vinyl acrylic latex, styrene acrylic latex or vinyl acetate ethylene latex.

WO 2012166830 discloses an aqueous coating composition including a composite particle including an opacifying pigment particle such as titanium dioxide and, disposed thereon, a plurality of particles of a first polymer and a second polymer. The first polymer contains phosphorous acid groups containing organic groups. The second polymer is a copolymer of organic units, typically carboxylic acid monomers and monoethylenically unsaturated monomers. The coating composition may further include inorganic particles. These inorganic particles are non-opacifying pigments which are useful as extenders.

US 2010218702 concerns a pigment spacing composition. A coating composition where the pigment particles are spaced is more uniformly resulting in improved coating properties. The composition has nanoparticles interacting with pigmentary titanium dioxide to provide for more uniform spacing of the titanium dioxide. As nanoparticles of $ZnO$, $SiO_2$ and $Al_2O_3$ are mentioned.

SUMMARY OF THE INVENTION

The inventors of the present invention have now surprisingly found that there exists a synergistic effect between the reactive polymer, the composite pigment and titanium dioxide.

The premise behind this invention is the unexpected interaction between the three components, namely titanium dioxide, reactive polymer and composite pigment which allows for the greater substitution of $TiO_2$ than if either the reactive polymer or the composite pigment were used alone with $TiO_2$. Used alone both technologies can help to replace up to 25 wt.-% $TiO_2$ without significant detriment to the coating properties by improving the "spacing" of the $TiO_2$. Since both products improve the efficiency of the $TiO_2$ in a similar way, a person skilled in the art would not expect their effects to be additive. However, when using a reactive polymer together with the composite pigment there is a synergy, which allows the replacement of far more $TiO_2$ than expected (up to 40 wt-% or more).

Thus, according to one aspect, this invention concerns a composition comprising titanium dioxide and additives useful for enhancing the optical performance of titanium dioxide or for allowing substitution of at least part of the titanium dioxide in said composition for additives. The composition is characterized in that at least two additives are added, wherein a first additive comprises a composite pigment and a second additive comprises a reactive polymer.

According to a second aspect, this invention concerns a method for enhancing the optical properties of a composition comprising titanium dioxide and additives useful for enhancing the optical performance of titanium dioxide or for allowing substitution of at least part of the titanium dioxide in said composition for additives. According to the invention, at least two additives are added, wherein a first additive comprises a composite pigment and a second additive comprises a reactive polymer, wherein a synergistic interaction between titanium dioxide, said composite pigment and said reactive polymer is created.

More specifically, the present composition comprises titanium dioxide and additives useful for enhancing the optical performance of titanium dioxide or for allowing substitution of at least part of the titanium dioxide in said composition for additives, wherein in that at least two additives are added, wherein a first additive comprises a composite pigment and a second additive comprises a reactive polymer, wherein said composite pigment comprises a shell-forming component and a pigment affecting the optical properties of the composition (optical pigment), wherein said optical pigment is at least partly embedded in the shell formed by the shell-forming component, and wherein said shell-forming component comprises an inorganic compound, preferably a precipitated inorganic compound.

The present method for enhancing the optical properties of a composition of titanium dioxide and additives useful for enhancing the optical performance of titanium dioxide or for allowing substitution of at least part of the titanium dioxide in said composition for additives, said method comprising the steps of adding at least two additives, wherein a first additive comprises a composite pigment and a second additive comprises a reactive polymer, wherein a synergistic interaction between titanium dioxide, said composite pigment and said reactive polymer is created, wherein said composite pigment comprises a shell-forming component and a pigment affecting the optical properties of the composition (optical pigment), wherein said optical pigment is at least partly embedded in the shell formed by the shell-forming component, and wherein said shell-forming component comprises an inorganic compound, preferably a precipitated inorganic compound.

The present invention offers important advantages over known technique.

Considerable amounts of titanium dioxide in the composition can be replaced by the combination of the composite pigment and the reactive polymer. Thus, 5-100 wt-%, preferably 5-60 wt-%, most preferably 25-45 wt-% of the original titanium dioxide content is replaced by the combined addition of the composite pigment and the reactive polymer while maintaining the original optical properties achieved by titanium dioxide alone.

The opacity/hiding ability is maintained or improved. The mechanical properties of the film e.g. scrub resistance, stain resistance, film elongation and water resistance can be maintained or improved.

DETAILED DESCRIPTION

The "composition" according to this invention shall be understood to include
- coating material compositions, particularly coatings for paper or board;
- paints;
- filling material compositions for paper or board, plastics or printing inks; and
- webs of paper or board or films, wherein said webs or films are coated with the aforementioned coating material composition or filled with the aforementioned filling material composition.

Preferably, the composition is a coating material composition.

The "composite pigment" comprises a shell-forming component and a pigment affecting the optical properties of the composition (in the following called optical pigment), wherein said optical pigment is at least partly embedded in the shell formed by the shell-forming component.

Composite pigments of this kind are described in WO 2009/109705, FP-Pigments Oy.

The "optical pigment" is a light-scattering and/or absorbing pigment, such as, but not limited to titanium dioxide, aluminium hydroxide, barium sulphate, kaolin, gypsum, ground or precipitated calcium carbonate, chalk, a silicate such as mica, magnesium carbonate, dolomite, talc, aluminium silicate, silica, or mixtures thereof, or organic pigment materials, such as plastic pigments and furnace black, or mixtures thereof.

Advantageously, the optical pigment comprises titanium dioxide.

The "shell-forming component" comprises an inorganic compound, preferably a synthetic, i.e. a precipitated inorganic compound, preferably an inorganic compound with low water solubility, such as precipitated calcium carbonate, calcium sulphate, barium sulphate, magnesium carbonate, magnesium silicate, aluminium hydroxide or aluminium silicate, most preferably precipitated calcium carbonate.

Preferably, the composite pigment comprises a shell-forming component, which is precipitated calcium carbonate and an optical pigment, which is titanium dioxide or a mixture of optical pigments, where one of the pigments is titanium dioxide.

The shell, which is formed of the calcium carbonate particles or other shell-forming components encases, partly or totally, approximately 1-20, especially approximately 1-10, preferably 1-6 optical pigment particles. The calcium carbonate structure is formed of calcium carbonate particles, the original size of which, before they are carbonated in order to attach them to other particles, is on average approximately 20-250 nm. When the calcium carbonate particles coalesce, they form an essentially continuous surface.

The weight ratio between the optical pigment particles and the calcium carbonate particles or other shell-forming components is approximately 90:10 . . . 5:95, preferably approximately 60:40 . . . 5:95, and especially approximately 40:60 . . . 10:90.

The composite pigment may comprise, besides the optical pigment particles and the calcium carbonate particles or other shell-forming components, also other elements, such as dispersants, surface modifying agents and stabilizing agents or mixtures thereof. However, the total amount of these is at maximum approximately 20 weight-% of the total weight of the composition, typically below 10 wt-%.

When the shell-forming component is precipitated calcium carbonate, the composite pigments are produced by atomizing a calcium hydroxide-bearing aqueous slurry comprising optical pigment particles into a carbon dioxide-bearing gas, wherein the calcium hydroxide was converted to calcium carbonate. In case the shell-forming component is another precipitated inorganic compound, the composite pigments can be prepared in a similar manner.

In this method, calcium carbonate particles are precipitated from calcium hydroxide and carbon dioxide in such a way that calcium carbonate particles adhere to the surface of optical pigment particles and are carbonated in order to attach them to other calcium carbonate particles, in which case essentially opaque and stable pigment-calcium carbonate aggregates are formed, which are at least partly covered with calcium carbonate particles.

Typically, carbonation is carried out continuously in such a way that the aqueous slurry undergoes at least one atomizing. The light-scattering and calcium hydroxide-bearing aqueous slurry which comprises optical pigment particles is then led through a high energy mixing zone, in which zone the aqueous slurry is broken up into drops or even into nebulous drops, and then dripped into a carbon dioxide-bearing gas. If necessary, dispersants, surface modifying agents or stabilising agents or mixtures thereof are added to the composite pigment to be manufactured during or after manufacturing.

Essentially, all of the calcium hydroxide-bearing aqueous slurry can be added to the carbonation together with the optical pigment particles. However, it is also possible to introduce the calcium hydroxide-bearing aqueous slurry into the carbonation gradually and in several batches, in which case most suitably at least part of the calcium hydroxide-bearing aqueous slurry is free of optical pigments when it is fed into the carbonation.

Suitable reactive polymers are described for example in U.S. Pat. Nos. 5,385,960A, 7,081,488B2 and US 2013/0085222A1.

In one embodiment, the reactive polymer comprises polymeric latex particles capable of adsorbing onto the titanium dioxide.

In another embodiment, the reactive polymer comprises polymer particles capable of forming covalent bonds with titanium dioxide. The covalent bonds can be formed directly between titanium dioxide and the reactive polymer. Alternatively, the covalent bonds are formed between titanium dioxide and reacted coupling agents bound to the reactive polymer.

According to a particularly preferred embodiment, the reactive polymer is a pre-composite polymer, for example of the kind wherein the polymer matrix is formed from a binder. The binder can be a polymer of pre-polymeric material. Thus, the polymer can be a homopolymer, a copolymer, or a blend of at least two polymers or copolymers. Specific examples of suitable polymer matrices include acrylic based pre-polymers, such as acrylic (co) polymers. The polymer matrices can incorporate vinyl acetate polymers, vinyl/acrylic copolymers, styrene/acrylic copolymers, polyurethanes, polyureas, polyepoxides, polyvinyl chlorides, ethylene/vinyl acetate polymers, styrene/butadiene polymers, polyester polymers, polyethers, and similar, as well as mixtures thereof. Preferred binders of the matrices are acrylic, polyurethane, vinyl acetate, VA/Veo Va, poly(vinyl acetate) and pressure polymer binders.

Particularly preferred embodiments are represented by EVOQUE™ pre-composite polymers supplied by Dow Coating Materials.

In addition to the three essential components (the reactive polymer, the composite pigment and $TiO_2$), the presence of an opaque polymer may also assist in the development of the final dry hide of the coating.

It is further possible to improve the dispersion of the $TiO_2$ in the dry film by using emulsions with smaller droplet sizes (e.g. of the EVOQUE™ type). The smaller the droplet size the better the $TiO_2$ is spaced during drying, thus helping to prevent pigment—pigment flocculation. This "spacing" is further enhanced by the reactive nature of the binder, which associates with the $TiO_2$ unspecific conditions.

Another way to improve the pigment performance is to "lock-in" the dispersion in such a way that, regardless of the drying conditions (or emulsion droplet particle size), the pigment cannot flocculate.

The use of both technologies (reactive polymer and composite pigment) in the same coating results in optimized and more efficient use of $TiO_2$ than if either technology is used alone or in conjunction with other $TiO_2$ enhancers/spacers/extenders.

The surface structure of the composite pigment used in the invention has been developed to allow the composite pigment to combine with both $TiO_2$ and the reactive polymer, e.g. an acrylic-based pre-polymer, e.g. EVOQUE™ (Dow). We believe that this may be the reason for the unexpected synergistic effect in the coating whereby up to 45 wt-% of the $TiO_2$ in a coating can be removed whilst maintaining the optical and mechanical properties of the coating.

The following non-limiting examples illustrate further embodiments.

Example

Various amounts of titanium dioxide in a coating composition were replaced by a reactive polymer only, by a composite pigment only and by a combined addition of a reactive polymer and a composite pigment. The results are presented in Table 1. The results show the potential synergy between a reactive polymer and the composite pigment. One can see that the use of both technologies together to replace $TiO_2$ is always better (in Contrast Ratio (CR) and Tint Strength (TS)) than just using the reactive polymer by itself. Table 2 shows the standard formulation.

TABLE 1

| | $TiO_2$ replaced by Reactive polymer (RP)/ Functional pigment (FP) | $TiO_2$ g per 100 g of Coating comp. | $TiO_2$ redn. wt-% | Contrast Ratio (CR) | L* | a* | b* | Tint strength (TS) | Wet opa-city WO | Stain | Gloss (degree of gloss) 20 | 60 | 85 |
|---|---|---|---|---|---|---|---|---|---|---|---|---|---|
| Standard | 0/0 | 14.5 | 0 | 96.3 | 96.1 | −0.52 | 2.84 | 61.1 | Std | Std | 1 | 2 | 5 |
| RP only | 25/0 | 10.87 | 25.0 | 96.1 | 95.9 | −0.49 | 2.92 | 60.0 | − | ++ | 1 | 2 | 6 |
| FP only | 0/25 | 10.87 | 25.0 | 96.2 | 96.0 | −0.51 | 2.94 | 60.5 | −− | ++ | 1 | 2 | 5 |
| RP only | 35/0 | 9.43 | 35.0 | 95.9 | 96.0 | −0.45 | 3.02 | 59.7 | − | + | 1 | 2 | 3 |
| RP + 1.1 wt-% FP460 | 25/10 | 9.43 | 35.0 | 96.3 | 96.0 | −0.47 | 2.9 | 60.8 | − | − | 1 | 2 | 6 |
| RP only | 40/0 | 8.7 | 40.0 | 96.0 | 96.0 | −0.45 | 3.02 | 59.7 | − | + | 1 | 2 | 3 |
| RP + 1.6 wt-% FP460 | 25/15 | 8.7 | 40.0 | 96.2 | 96.0 | −0.45 | 2.86 | 60.6 | − | + | 1 | 2 | 6 |

In Table 1 above RP means "reactive polymer" and is EVOQUE™ (Dow); FP is a "composite pigment"; FP460 is a composite pigment supplied by FP-Pigments, comprising calcium carbonate and titanium dioxide. The composition of the standard formulation "Standard" is shown in Table 2. Pvc means particle volume concentration. CR=Contrast Ratio (a measure of hiding power). RlB=Reflectance over a black substrate—a measure of reflected light also important. L*=Brightness (scale 0 to 100. 0 is black, 100 is pure white). a*=Red/Green shift a −ve value indicates a green colour, a +ve value indicates a red colour. b*=Blue/Yellow shift a −ve value indicates a Blue colour, a +ve value indicates a Yellow colour. TS=Tint strength or tint reducing power, the higher the better in most cases. This is a measure of the ability of the pigments to reduce (make paler) the strength of the colour added—in this case a blue tint, WO=Wet opacity, the hiding power of the paint when first applied and still wet. This is important and should be similar to the standard. An indication of one −ve sign suggests it is slightly lower in wet hide but not easy to see, 2 −ve's suggest well down and easily seen, 3 −ve's would be an obvious difference. Stain=A measure of the porosity of the film. The stain level should be the same as the standard or within one +. The higher the stain the more porosity there is in the film and more hiding is gained from air rather than the pigment. Comparing the performance of any two paints should ideally be done at the same porosity/stain level. 20=20 degree gloss value; 60=60 degree gloss value; 85=85 degree gloss value

TABLE 2

| Standard formulation | |
|---|---|
| | STD |
| Water | 170.25 |
| Cellosize QP4400H | 2.70 |
| Ammonia (25%) | 1.02 |
| CHP-805 | 1.26 |
| Texanol | 4.86 |
| Foamaster NXZ | 0.90 |
| Acticide MV 14 1:10 | 3.60 |
| pH | 10.0 |
| TIOXIDE ® TR92 | 87.10 |
| Queensfil 25 | 85.36 |
| Polestar 200P | 85.36 |
| Water | 70.13 |
| Mowilith LDM 2383 | 86.56 |
| Total | 599.10 |

TABLE 2-continued

| Standard formulation | |
|---|---|
| | STD |
| W. Solids | 52.03 |
| Vol. Solids | 32.00 |
| TiO2vc | 17.00 |
| Evc | 51.00 |
| pvc | 68.00 |

The experiment shows an unexpected interaction between the three components, namely titanium dioxide, reactive polymer and composite pigment, which allows for the greater substitution of $TiO_2$ than if either the reactive polymer or the composite pigment were used alone with $TiO_2$.

Used alone both technologies can help to replace up to 25 wt-% $TiO_2$ without significant detriment to the coating properties by improving the "spacing" of the $TiO_2$. Since both products improve the efficiency of the $TiO_2$ in a similar way, a person skilled in the art would not expect their effects to be additive.

However, when using a reactive polymer together with the composite pigment there is a synergy, which allows the replacement of far more $TiO_2$ than expected, up to 40 wt-% or more. This synergy has been demonstrated in the Example, Table 1. In Table 1 one can see that when 35 or 40 wt-% of $TiO_2$ was replaced by either reactive polymer only (RP) or by a combination of reactive polymer and composite pigment (RP+FP460), a better contrast ratio and a better tint strength was observed for the replacement with a combination of reactive polymer and composite pigment (RP+FP460), compared to the values obtained for replacement with reactive polymer (RP) alone.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An composition comprising a combination of titanium dioxide and additives useful for allowing substitution of at least a part of the titanium dioxide in said composition by said additives while maintaining the contrast ratio achieved by a composition comprising titanium dioxide without said additives, the additives comprising a composite pigment and a reactive polymer, wherein said composite pigment comprises titanium dioxide at least partly embedded in a shell formed by precipitated calcium carbonate and wherein the combination of titanium dioxide and said additives comprises 55 to 75 wt % titanium dioxide and the remainder the composite pigment and the reactive polymer.

2. The composition according to claim 1, wherein said composition is a coating material composition.

3. The composition according to claim 1, wherein said composition is selected from the group consisting of
   coating material compositions;
   paints;
   filling material compositions for paper or board, plastics or printing inks; and
   webs of paper or board or films, wherein said webs or films are coated with the aforementioned coating material composition or filled with the aforementioned filling material composition.

4. The composition according to claim 3 wherein the coating material compositions comprise coatings for paper or board.

5. The composition according to claim 1, wherein the reactive polymer comprises polymeric latex particles capable of adsorbing onto the titanium dioxide.

6. The composition according to claim 1, wherein the reactive polymer comprises polymer particles capable of forming covalent bonds with titanium dioxide.

7. The composition according to claim 6, wherein the covalent bonds are formed directly between titanium dioxide and the reactive polymer.

8. The composition according to claim 6, wherein the covalent bonds are formed between titanium dioxide and reacted coupling agents bound to the reactive polymer.

9. The composition according to claim 1, wherein the reactive polymer is formed from acrylic, polyurethane, vinyl acetate, VA/Veo Va, or poly(vinyl acetate).

10. The composition according to claim 1, wherein the reactive polymer is an acrylic-based pre-composite polymer.

11. The composition according to claim 1, which comprises from 8.7 to 9.43 wt % titanium dioxide, from 1.45 to 2.17 wt % composite pigment and 3.625 wt % reactive polymer.

12. The composition according to claim 11 which comprises 9.43 wt % titanium dioxide, 3.625 wt % reactive polymer, and 2.175 wt % composite pigment.

13. The composition according to claim 11 wherein the wt % of titanium dioxide is selected from 9.43 wt % and 8.7 wt %.

14. The composition according to claim 11 which comprises 9.43 wt % titanium dioxide, 3.625 wt % reactive polymer, and 1.45 wt % composite pigment.

* * * * *